Aug. 29, 1967 Z. KAUFMAN 3,339,020

DISPOSABLE PHOTOGRAPHIC DEVICE FOR RECORDING TELEVISION IMAGES

Filed May 26, 1965 4 Sheets-Sheet 1

INVENTOR.
ZOLTAN KAUFMAN
BY
Brown, Critchlow, Flick & Peckham.
ATTORNEYS.

INVENTOR.
ZOLTAN KAUFMAN
BY
Brown, Critchlow, Flick & Peckham.
ATTORNEYS.

Aug. 29, 1967 | Z. KAUFMAN | 3,339,020

DISPOSABLE PHOTOGRAPHIC DEVICE FOR RECORDING TELEVISION IMAGES

Filed May 26, 1965 | 4 Sheets-Sheet 3

INVENTOR.
ZOLTAN KAUFMAN
BY
Brown, Critchlow, Flick & Peckham.
ATTORNEYS.

INVENTOR.
ZOLTAN KAUFMAN
BY
Brown, Critchlow, Flick & Peckham.
ATTORNEYS.

3,339,020

DISPOSABLE PHOTOGRAPHIC DEVICE FOR RECORDING TELEVISION IMAGES

Zoltan Kaufman, 1172 Stanton Terrace, Pittsburgh, Pa. 15201

Filed May 26, 1965, Ser. No. 458,847
25 Claims. (Cl. 178—7.4)

This invention relates to a device for photographically recording a designated image projected on a television screen; for the purpose, among others, of proving that the person using the device had been among the viewers watching a certain television program. The invention may be used, for example, in connection with promotional and educational television for the purpose of attracting a greater television audience for a given program.

In the exemplary use mentioned above, the device of the invention is intended to be distributed to a very large number of potential television viewers, who are instructed to watch a particular program where prizes will be awarded to certain members of the viewing audience. During that program a designated image, not previously disclosed, is projected on the television screen. At this point, viewers are instructed to hold the device, properly oriented, against the screen. The device includes means, operable by the viewer, for exposing a light-sensitive film to the designated image to record it. Other means, also operated by the viewer, terminate the exposure and preserve the latent recorded image for future development; and, by the operation of this second means, the device is rendered inoperable for thereafter recording an image.

To limit further the number of viewers entitled to prizes, each device is preferably provided with any one of a number of identifying symbols, only one of which (for example, one corresponding to the designated image) may be a prize winning symbol. In any event, the symbol is displayed to the user of the device promptly after, but not before, the device has been rendered imoperable for recording an image. The user is thereby immediately informed whether or not he has won a prize, prompt information on this point being an important factor in creating audience interest. Sponsors awarding the prizes are safeguarded by giving them only to those persons who submit intact devices (1) displaying the winning identifying symbol and also (2) containing a latent photographic image that, on development, corresponds to the designated image previously projected on the television screen.

The device of this invention is intneded to be distributed to millions of people at nominal or no charge, to be used once, and then disposed of. These conditions require that the device be very inexpensive to manufacture, easy to distribute, and simple to use. It is among the objects of this invention to provide such a device.

Other objects will be apparent from the following description of a preferred embodiment of the invention, in connection with the attached drawings, in which FIG. 1 is a view of one side of the paper sheet that on being folded forms the envelope portion of the device of this invention;

The device of this invention comprises a packet of superimposed sheets, preferably of stiff paper. These shets include a front and back cover, a shutter, and a film carrier. The last two elements are enclosed between and movable inside of the covers, which are held in substantially sealed marginal engagement to form an opaque, light-tight envelope, except for a scanning window on a portion of the front cover. Behind the window is the shutter, and behind the shutter is the film carrier supporting a light-sensitive film. Normally, both shutter and film are in registry with the scanning window, but no light reaches the film so long as the shutter covers the window. Both the shutter and film carrier are separately shiftable in the envelope from a normal first position described above to a second position, in which they are out of registry with the scanning window. Means are provided for moving the shutter from its first to its second position, thereby exposing the film to light passing through the window. There are separate means for moving the film carrier and film from their first to their second positions after the film has been exposed for the proper time. Additional means are provided to prevent the return of the film carrier and film, and preferably of the shutter as well, from their second positions back to their first positions. Preferably, there are also means for displaying an identifying symbol to the user, but the display is made visible only by moving the film carrier and film to their second positions.

Figure 1:
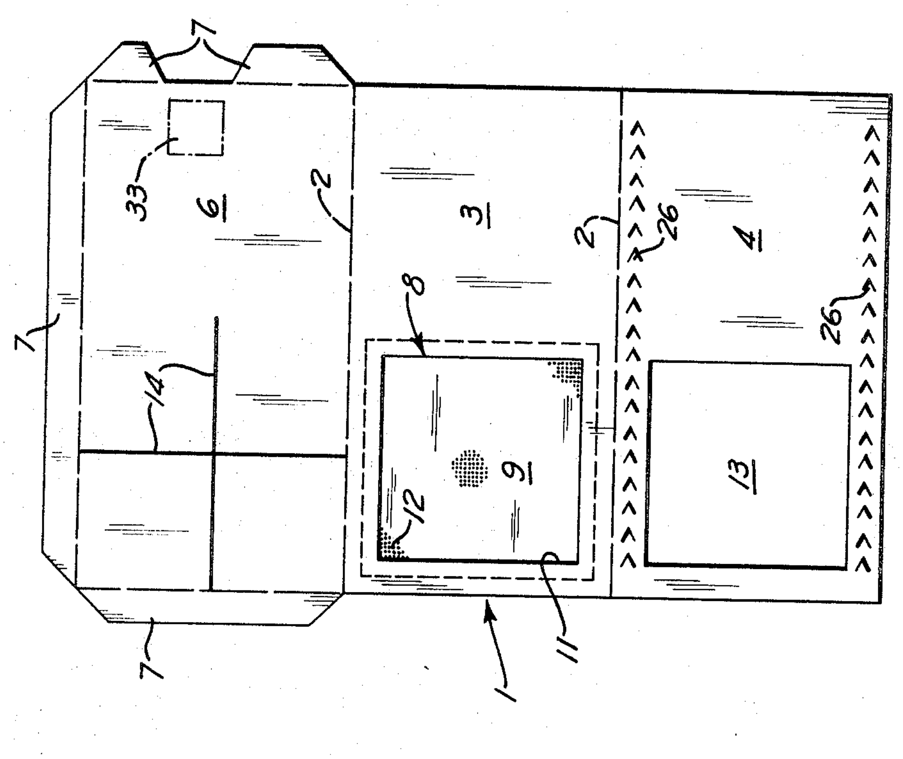
Figure 2:
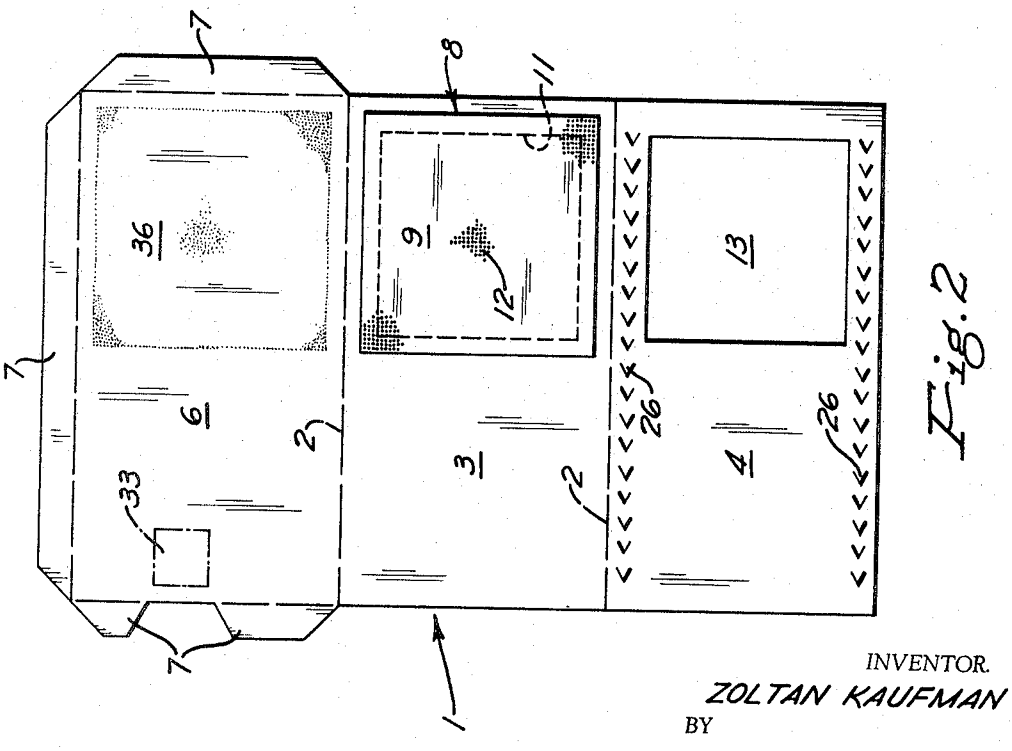
FIG. 2 is a view of the opposite side of the same sheet.
Figure 3:
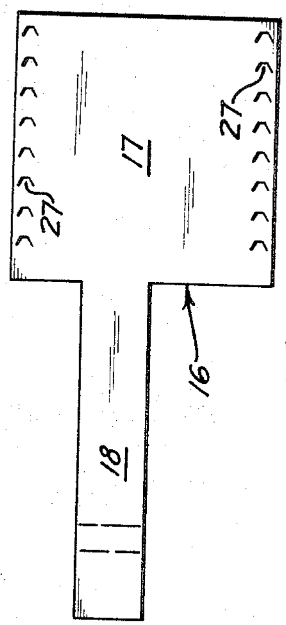
FIG. 3 shows the sheet used as a light shutter.

Referring to the drawings, the envelope portion of the device is preferably made from a single sheet of stiff paper 1 that can be folded along the broken lines 2 as indicated in FIGS. 1 and 2. This portion includes a front cover 3, a partition or locking sheet 4, and a back cover 6. One of the covers is provided with foldable tabs 7, coated with a suitable adhesive (not shown) for sealing the marginal edges of the envelope, except for a slot on one side edge as described later herein.

The front cover 3, preferably of rectangular shape, is provided at one end with a scanning window 8, which may be in the form of a screen 9 made from translucent paper, glued inside the cover across an opening 11 therein. The translucent paper is preferably provided with an array of dots 12, which give a half-tone effect to the recorded image. The remaining portion of the front cover is opaque and preferably at least as large as the window portion. The partition or locking member 4 has an opening 13 therein of substantially the same shape and size as the scanning window and adapted to be in registry with the window when the device is assembled.

The back cover 6 is provided with guide lines 14, for aligning the device as hereinafter described. These guide lines may be in the form of two lines intersecting at right angles to each other. In the assembled device, the point of intersection of these lines is desirably in registry with the center of the scanning window on the front cover.

A shutter member 16, made from a separate sheet of paper, has a shutter portion 17 of a size and configuration to cover the scanning window. The shutter member also has a narrower tab portion 18 for moving the shutter inside the envelope as hereinafter described. Similar in shape to the shutter member is a film carrier 19 supporting on one face thereof a light-sensitive film 21. This film is preferably of a slow reaction type, such as is often used in making positive photographic contact prints. Such film or print paper may be secured by a suitable adhesive (not shown) to the film carrier with the emulsion side of the film facing away from the carrier. If desired, the emulsion can be deposited directly on the carrier itself. The film carrier also includes an operating tab 22, which is similar to and used for the same purpose as tab 18 on the shutter member. An identifying symbol, in this case the letters "IT," is printed on tab 22 close to the film 21, so that the symbol will be exposed to view only under the conditions described later herein.

Figure 5:
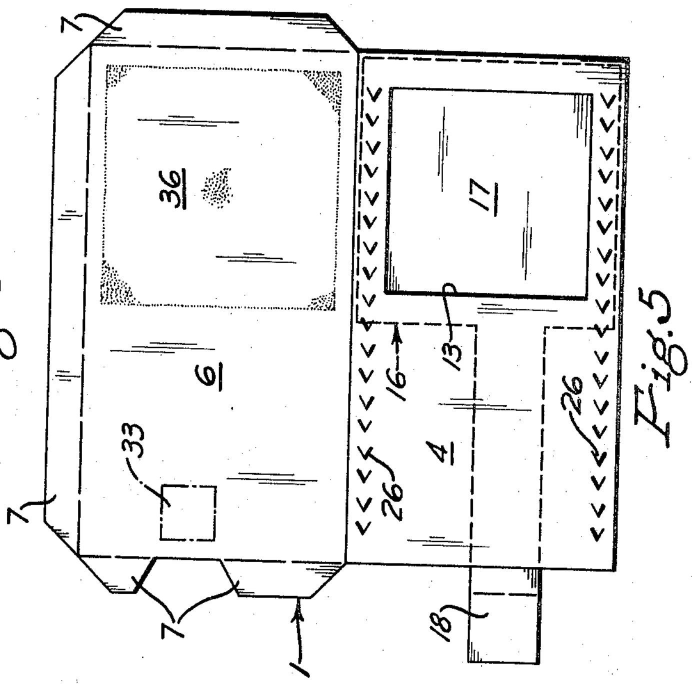
FIG. 5 shows one stage in the assembly of the above elements.
Figure 4:
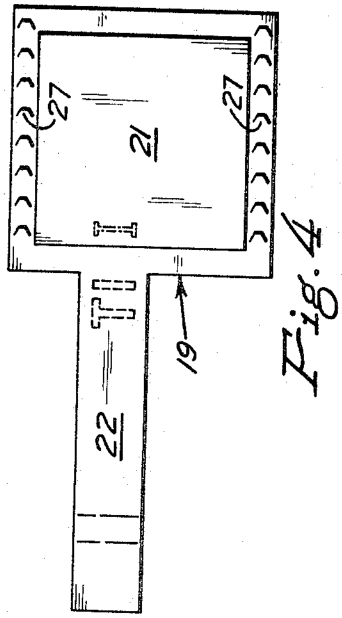
FIG. 4 shows the sheet used as a film carrier and the light-sensitive film supported thereon.
Figure 6:
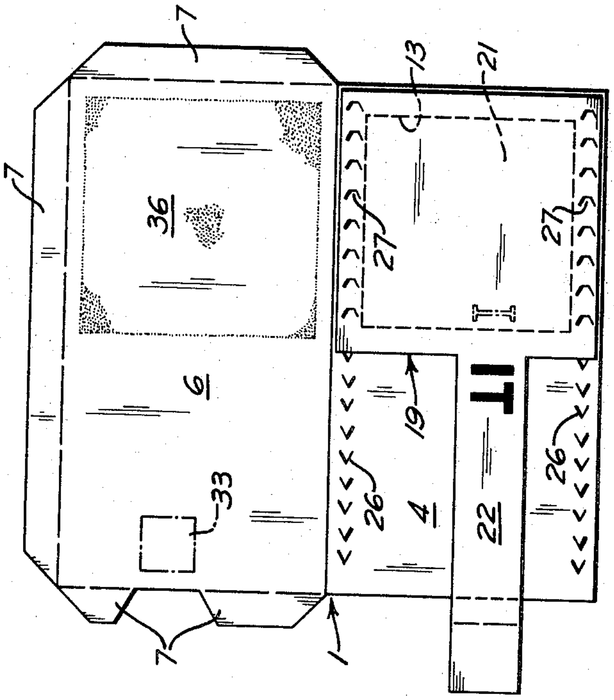
FIG. 6 shows a later stage in that assembly.

In assembling the device, the shutter member 16 is placed against the inside of the front cover directly behind the scanning window and in registry therewith. Tab 18 extends to one side of the window and beyond the far edge of the front cover. The partition sheet 4 is now folded over the shutter member, and at this stage the partially assembled device appears as shown in FIG. 5. The film carrier is next placed on the partition sheet with the film emulsion against that sheet and in registry with the scanning window, and tab 22 extends to one side and overlies tab 18 of the shutter member, as shown in FIG. 6. The back cover 6 is then folded down over the film carrier; and sealing tabs 7 are folded around the edge of the front cover and adhered thereto, leaving an unsealed portion or slot 23 at one edge of the device through which tabs 18 and 22 extend. The protruding ends of those tabs are preferably partially folded back over the adjacent cover (see FIG. 9), and each tab may be held in place by a pressure-sensitive adhesive strip 24.

Figure 7:
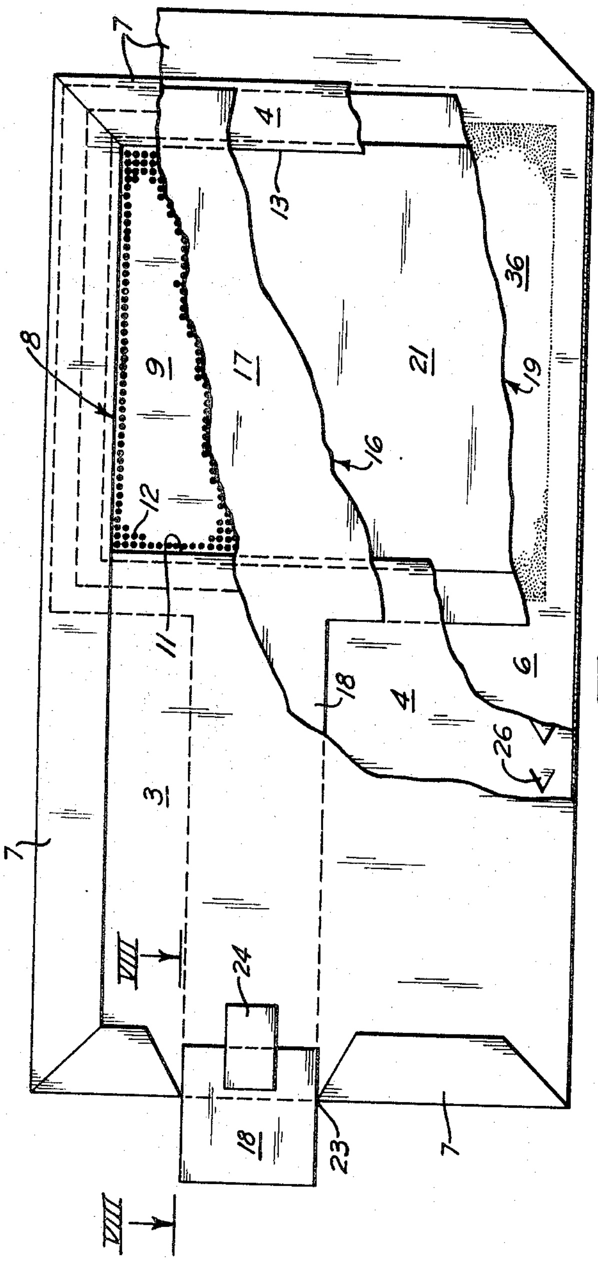
FIG. 7 is an enlarged front view of the assembled device, in which the various sheets are superimposed in closely packed layers, with portions of the superimposed sheets being removed to show the relationship of the underlying sheets.

The completely assembled device is shown in FIG. 7. From front to back, the various members are arranged in the following order: front cover 3, shutter 17, partition or locking member 4, film 21 and its supporting film carrier 19, and back cover 6. In this assembly, shutter member 17 and film carrier 19 are, except for the locking means described below, free to slide back and forth between one of the covers and partition member 4. Initially, the shutter member and film carrier are in their first positions as shown in FIG. 7, where the shutter and film are both in registry with scanning window 8 in the front cover. When the device is being used in accordance with its intended purpose, the shutter and film carrier are moved separately, by pulling the tab attached to each, to a second position inside the package, where they are out of registry with the scanning window. Locking means are provided that will not interfere with such movement but will effectively prevent the return of those members to their first positions. A preferred form of locking means includes two parallel rows of locking tongues 26 in partition or locking member 4, each row being adjacent to a long edge of that sheet and extending substantially its full length. Tongues 26 may conveniently be formed as V-shaped incisions in the paper sheet, all pointing in the same direction towards the opaque (non-window) end of the sheet. Preferably, the tips of some of these tongues are bent slightly upwards and those of others slightly downwards so that their tips project alternately from both sides of the partition sheet. Similar tongues 27, but preferably having blunter tips, are provided in registering top and bottom rows on shutter member 17 and the film carrier 19, but the projecting portions of these latter tongues point in the opposite direction to those on partition sheet 4. All of the tongues 27 on both the shutter and the film carrier are preferably bent so that they project slightly towards the complementary tongues on the adjacent partition sheet when the various sheets are assembled together. Because of the directions in which the tongues extend, it is apparent that they will not interfere with movement of the shutter and film carrier from their first to their second positions. However, any attempt to move either of those members from its second back to its first position will result in interlocking engagement between tongues 27 on the member sought to be moved and the opposite facing tongues 26 on the partition or locking sheet. (This interlocking engagement is shown in enlarged detail in FIG. 12 where the spacing between the partition or locking sheet 4 and shutter member 16 and film carrier 19 on either side of it has been exaggerated for clarity.) In other words, once the tab of either the shutter member or the film carrier has been pulled to move that member into its second position out of registry wtih the scanning window, that member cannot be moved back into its first position without tearing the tongues or otherwise destroying the integrity of the package.

The device may have printed on its front and back covers suitable directions (not shown) for its intended use, as well as printed material (not shown) advertising the products or services of the sponsor who may distribute these devices. As previously stated, these devices are intended to be distributed in large numbers to potential television viewers for use in increasing viewer participation in one or more selected television programs. During such a program, a designated image such as the word IT (see FIG. 9), is projected on the television screen, preferably centered thereon and symmetrically disposed relative to intersecting guidelines 31, which are also projected on the screen. Persons who are viewing the program and who have the device of this invention in their possession are instructed at the appropriate time to hold each device with the front cover resting against the television screen and with the guidelines 14 on the back cover 6 registering with the projected guidelines 31. When told to do so by the program director, the viewer pulls shutter tab 18 as far as it will go (after breaking the adhesive seal 24) to move shutter 17 from behind scanning window 8 and thereby expose film 21 to light passing through that window and through opening 13 in partition sheet 4 (see FIG. 10). The viewer continues to hold the device against the television screen for the proper interval of time to permit the image to be recorded on the film. This interval may be indicated by the program announcer, as, for example, in the form of a countdown. At the proper time, when the film has been sufficiently exposed, the viewer is directed to pull the second tab 22, which moves the film carrier 19 and film 21 from behind the window to the dark storage space in the opaque portion of the envelope where the film is out of registry with the window and where the latent image 32 on the film is intended to remain until developed or until the device is thrown away (see FIG. 11).

Figures 9, 10, 11, 12:
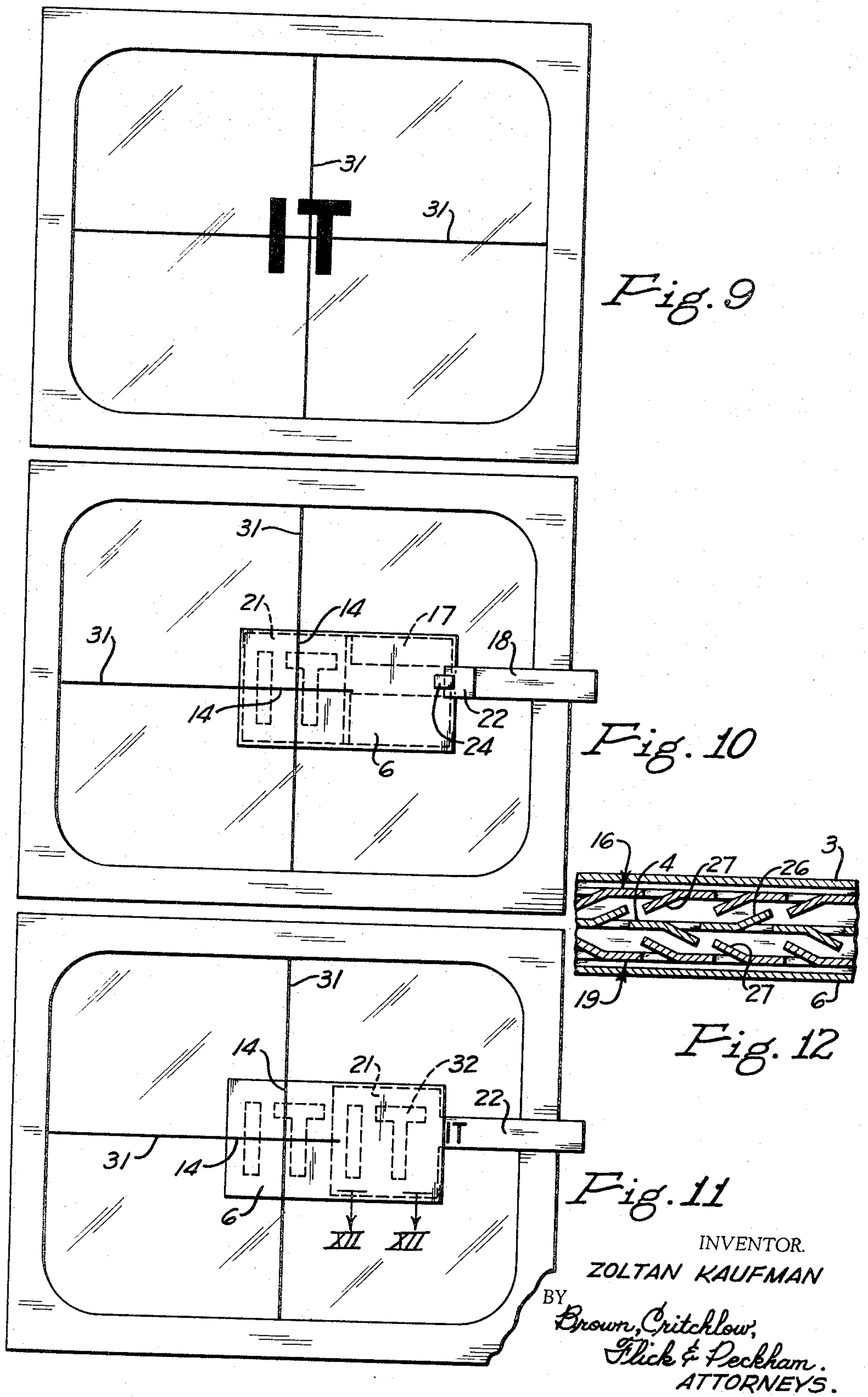
FIG. 9 is a diagrammatic view of a television screen with a designated image projected thereon.
FIG. 10 illustrates how the device, represented in reduced size, is held against the television screen of FIG. 9 and the positions of certain parts of the device when the film is being exposed to the image on the screen.
FIG. 11 is similar to FIG. 10 but with the parts in their positions after the exposure of the film has been ended and the device rendered useless for recording a further image.
FIG. 12 is an enlarged and partially expanded section along the line XII—XII of FIG. 11, showing the means for rendering the device inoperable to record an image.

A substantial prize may be offered to those viewers who have photographed by this means the designated image projected on the television screen and who, in addition, hold devices that display certain identifying symbols. For example, the winning symbol may coincide with the designated image projected on the television screen. As soon as the viewer has pulled his film carrier tab to put his film in storage, the identifying symbol on his particular device will be displayed on the portion of the tab 22 adjacent the film 21, but the symbol becomes visible only when the tab has been pulled to its fullest extent, as shown in FIG. 12. Other ways may be used to make an identifying symbol visible only after the film carrier 19 has been moved to its second position. For example, a window 33 may be provided on the back cover 6 (as shown in broken lines in FIGS. 1–2 and 5–6), either in the form of a transparency or an openable flap, for displaying a symbol I, as shown in broken lines in FIG. 6, on the back of the film carrier 19 at a place thereon that registers with window 33 when the film carrier is in its second position.

Where a clear transparency is used for the scanning window 8 in the front cover, the identifying symbol (not shown) may also be printed on the inside of the back cover 6 so as to be visible through the scanning window only after the shutter 17 and film carrier 19 have both been moved to their second positions.

Under some circumstances, it may be desirable to provide means whereby the holder of the device can record a massage inside the packet, as for example, a written answer to a question asked on the television program, before the film has been exposed to recording the television image, particularly where such means will also prevent the holder from effectively recording any message after the film has been exposed and moved from its first to its second position. Such means can be provided in the form of a transfer carbon coating 36 on, for example, the inside of the back cover 6 in registry with the back of the film carrier 19 when the latter element is in its first position. The holder can then write with a pencil, or other form of stylus, on the outside of the back cover and the writing will be transferred by the carbon coating to the back of the film carrier. Alternatively, the carbon coating (not shown) may be placed on the inside of the front cover immediately adjacent the scanning window 8, so that a carbon transfer can be made to the marginal portions of shutter 17 extending beyond the scanning window 8 before the shutter has been moved from its first to its second position. It will be apparent that, when the film carrier or the shutter, as the case may be, is moved to its second position, so that it no longer underlies the carbon coating on the adjacent cover, a carbon image can no longer be transferred to one of those members. The correctness of the answer recorded in the form of a carbon image, as described above, can be ascertained when the device is opened up by the sponsor of the television program or its agent for the purpose of developing the latent photographic image on the film 21. It will be understood, of course, that instead of a carbon coating on the inside of one of the covers, other coatings could be used that would transfer an image to an adjacent sheet by the application of pressure from a stylus-like instrument when pressed against the outside of the cover.

The device described herein can be manufactured very cheaply. Because it is flat and small in size, it can be distributed easily to members of the public. When tied to a prize-awarding television program, it should increase audience interest because it involves active participation in the program by the holder of the device and because the holder is immediately aware, as soon as the identifying symbol on his device is displayed, whether or not he has won a prize.

Figure 13:
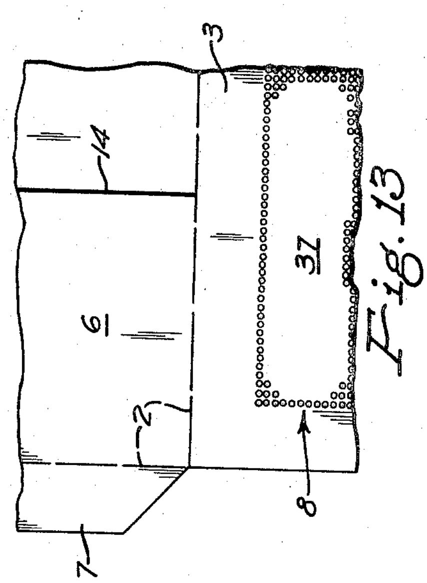
FIG. 13 is a fragmentary enlarged view of the sheet in FIG. 1, showing a modified form of scanning window.
Figure 8:
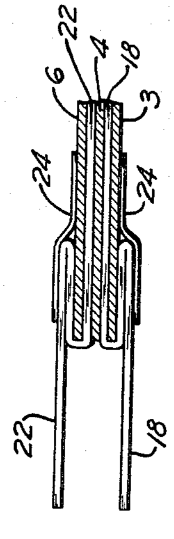
FIG. 8 is a section on the lines VIII—VIII of FIG. 7.

It will be apparent that the device of this invention could be other than rectangular in shape; for example, it could be circular or in the form of a segment of a circle, in which the shutter and film carrier (with its supported film) would move circumferentially about some fixed pivot point. In addition, the scanning window on the front cover can be modified, as shown in FIG. 13, in which the window is an array of small holes 37 in the front cover 3. These holes would transmit an image with a half-tone effect similar to that produced by the dots 12 in the translucent screen of FIGS. 1 and 7. Still other variations are possible without departing from the spirit of the present invention.

The preferred position for the partition or locking member 4 is, as described herein, between shutter member 16 and film carrier 19. In that position, member 4 separates the latter two elements, as well as locking both of them in their second positions. Under some circumstances, however, it may be desired to place film carrier 19 directly behind shutter member 16, in which case member 4 would be put between the film carrier and back cover 6 and would act solely as a locking member (so that opening 13 therein would not be needed). In such case, tongues 26 and 27 on the locking member and film carrier, respectively, would project towards each other to provide interengaging locking edges and tongues 27 on the shutter member would be dispensed with. It will be noted that, in the absence of tongues 27, tongues 26 are still adapted to engage the right-hand edge of any shiftable member adjacent locking sheet 4 (looking at FIG. 7) when an attempt is made to move that shiftable member from its second back to its first position.

In the modified arrangement described above, in which the film carrier is located between the shutter member and the locking member, adhesive strip 24 on tab 22 will tend to hold film carrier 19 in its first position while tab 18 is being pulled by the holder to move shutter member 16 from its first to its second position. Other suitable means can also be used to assure that the shutter member and film carrier will be separately shiftable from their first to their second positions. In this connection, and to make it easier for the holder to distinguish between tabs 18 and 22, the tabs can be offset vertically and pass through separate slots in the edge of the packet.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A device of the type described for recording a designated image projected on a television screen, comprising a packet of superimposed sheets that include a front cover and a shutter member and a light-sensitive member and a back cover, the two covers being held in substantially closed marginal engagement to form an envelope, the front cover having a scanning window in one portion for admitting light through that portion, the shutter and light-sensitive members being mounted between and separately shiftable relative to the front and back covers with the shutter member next to the front cover and normally occluding the passage of light from the window to the light-sensitive member, separate means for separately moving first the shutter member and then the light-sensitive member from a first position behind the scanning window to a second position behind another portion of the front cover, and locking means for preventing the light-sensitive member from being returned from its second to its first position.

2. A device according to claim 1, in which the separate means for moving the shutter member and the light-sensitive member include separate narrow tabs extending through a slot in one edge of the device.

3. A device according to claim 1, that also includes means for displaying an identifying symbol associated with the device only after the light-sensitive member has been moved from its first to its second position.

4. A device for recording a designated image projected on a television screen, comprising an envelope-type packet that includes a front cover and a back cover held in substantially sealed marginal engagement, a scanning window in one portion of the front cover for admitting light through that portion, a partition member mounted between the covers and having an opening therein registering with the scanning window, a shutter member mounted between the front cover and the partition member and movable therebetween from a first light-obstructing position behind the scanning window to a second position behind another portion of the front cover to permit light to pass from the scanning window through the opening in the partition member, a light-sensitive member mounted between the partition member and the back cover and movable therebetween from a first position behind the screening window to a second position behind another portion of the front cover, and separate means for separately and sequentially moving the shutter member and then the light-sensitive member from their first to their second positions, and locking means for preventing the light-sensitive member from being moved from its second to its first position.

5. A device for recording a designated image projected on a television screen, comprising an envelope-type packet that includes a front cover and a back cover held in substantially sealed marginal engagement, a scanning window in one portion of the front cover for admitting light through that portion, a partition member mounted between the covers and having an opening therein registering with the scanning window, a shutter member mounted between the front cover and the partition member and movable therebetween from a first light-obstructing position behind the scanning window to a second position behind another portion of the front cover to permit light to pass from the scanning window through the opening in the partition member, a film carrier supporting a light-sensitive emulsion, the film carrier being mounted between the partition member and the back cover and movable therebetween from a first position in which the emulsion is directly behind the opening in the partition member to a second position in which light passing through said opening will not reach the emulsion, and separate means for separately and sequentially moving the shutter member and then the film carrier from their first to their second positions, and locking means for preventing the film carrier from being moved from its second to its first position.

6. A device according to claim 5, in which the locking means include a first set of tongues projecting from the partition member and a second set of similar tongues projecting from the film carrier, the tongues of one set extending in opposite directions to the tongues in the other set, and at least some of the tongues of one set being adapted to engage and interlock with at least some of the tongues of the other set when the film carrier is moved from its second towards its first position.

7. A device according to claim 5, in which each of the separate means for moving the shutter member and film carrier include a narrow pulling tab extending outside the packet through a slot in the edge thereof.

8. A device according to claim 7, in which the external portion of each tab is partially folded back on the adjacent cover and temporarily attached thereto to prevent accidental pulling of the tab.

9. A device according to claim 5, in which the scanning window comprises numerous closely spaced perforations in the front cover.

10. A device according to claim 5, in which the scanning window is in the form of a translucent member covering a defined opening in the front cover.

11. A device according to claim 10, in which the translucent member is provided with an array of opaque dots to produce a half-tone effect to an image transmitted through the window.

12. A device according to claim 5 that also includes an identifying symbol that is visibly displayed only after the film carrier has been moved from its first to its second position.

13. A device according to claim 12, in which the identifying symbol is printed on a portion of the tab attached to the film carrier, so that it will be be visibly exposed outside of the packet only when the tab has been pulled to move the film carrier from its first to its second position.

14. A device according to claim 5, that also includes locking means for preventing the shutter member from being returned from its second to its first position.

15. A device according to claim 14, in which the locking means include a first set of tongues projecting from the partition member and a second set of similar tongues projecting from the shutter member, the tongues of one set extending in opposite directions to the tongues in the other set and at least some of the tongues of one set being adapted to engage and interlock with at least some of the tongues of the other set when the shutter member is moved from its second towards its first position.

16. A device according to claim 5, in which the elements recited therein are made of stiff paper.

17. A device according to claim 5 that also includes aligning marks on the back cover adapted to match complementary marks projected on a television screen.

18. A device according to claim 5 that also includes a pressure sensitive image transfer coating on a portion of the inside surface of the film carrier when the latter is in its first, but not in its second, position for recording pressure markings made by a stylus-like instrument on the corresponding portion of the outside of the back cover.

19. A device according to claim 5 that also includes a pressure sensitive image transfer coating on a portion of the inside surface of the front cover in registry with an adjacent surface of the shutter member when the latter is in its first, but not in its second, position for recording pressure markings made by a stylus-like instrument on the corresponding portion of the outside of the front cover.

20. A device according to claim 5 that also includes a viewing window in the back cover for displaying an identifying symbol appearing on the back of the film carrier when the film carrier is in its second position.

21. A device of the type described for recording a designated image projected on a television screen, comprising a packet of superimposed sheets that include a front and back cover and a shutter and a light-sensitive member and a locking member, the two covers being held in substantially closed marginal engagement to form an envelope enclosing the other sheets, the front cover having a scanning window in one portion for admitting light through that portion, the shutter and the light-sensitive member being separately shiftable relative to the front cover with the shutter between the light-sensitive member and the front cover and normally occluding the passage of light from the window to the light-sensitive member, separate means for separately shifting first the shutter and then the light-sensitive member from a first position behind the scanning window to a second position behind another portion of the front cover, the locking member being positioned adjacent the light-sensitive member, and locking means on one of said members engageable with the other of said members for preventing the light-sensitive member from being returned from its second to its first position.

22. A device according to claim 21, in which the locking means include a plurality of tongues projecting from one of said members towards the other of said members.

23. A device according to claim 22, in which the locking member is positioned between the shutter and the light-sensitive member and is provided with an opening registering with the scanning window to permit light to pass through that window to the light-sensitive member when the shutter is in its second position.

24. A device of the type described for recording a designated image projected on a television screen, comprising a packet of superimposed sheets that include a front and back cover and a shutter and a film carrier and a locking member, the two covers being held in substantially closed marginal engagement to form an envelope enclosing the other sheets, the front cover having a scanning window in one portion for admitting light through that portion, a photographic emulsion supported on the film carrier, the shutter member and the film carrier each being separately shiftable relative to the covers from a first position in which the shutter and the emulsion are both in registry with the scanning window and in which the shutter occludes the passage of light through that window to the emulsion to a second position out of registry with the window, means for shifting the shutter from its first to its second position for initiating the exposure of the film to said designated image when the device is held in contact with the television screen with the scanning window in registry with said projected image, separate means for shifting the film carrier and its supported emulsion from its first to its second position for terminating said exposure, and locking means on one of said members engageable with the other of said members for preventing the film carrier from being returned from its second to its first position.

25. A device of the type described for recording a designated image projected on a television screen, comprising a packet of closely superimposed sheets that include a front cover and a light-sensitive member and a back cover, the two covers being held in substantially closed marginal engagement to form an envelope with the light-sensitive member enclosed therein, a scanning window in the front cover, manually operable means first for initiating exposure of the light-sensitive member to the projected image when the scanning window is placed against a television screen and then for terminating such exposure, and means for preventing the light-sensitive member from being further exposed to a source of light.

References Cited

UNITED STATES PATENTS 2,704,784 3/1955 Hammond ---------- 178—7.4

JOHN W. CALDWELL, *Acting Primary Examiner.*

H. W. BRITTON, *Assistant Examiner.*